(12) United States Patent
Day et al.

(10) Patent No.: US 11,907,229 B2
(45) Date of Patent: Feb. 20, 2024

(54) SYSTEM AND METHOD FOR PLATFORM-INDEPENDENT ACCESS BINDINGS

(71) Applicant: GM Cruise Holdings LLC, San Francisco, CA (US)

(72) Inventors: Stephen James Day, Kirkland, WA (US); Seth Alexander Bunce, Seattle, WA (US); Matthew John Landis, Bothell, WA (US); Jonathan Langefeld, Lathrop, CA (US); Jason Vrablik, Monroe, WA (US); Cheng Pan, Bellevue, WA (US)

(73) Assignee: GM Cruise Holdings LLC, San Francisco, CA (US)

( * ) Notice: Subject to any disclaimer, the term of this patent is extended or adjusted under 35 U.S.C. 154(b) by 23 days.

(21) Appl. No.: 17/710,310

(22) Filed: Mar. 31, 2022

(65) Prior Publication Data

US 2023/0315739 A1 Oct. 5, 2023

(51) Int. Cl.
| | |
|---|---|
| *G06F 7/00* | (2006.01) |
| *G06F 16/2457* | (2019.01) |
| *G06F 16/2455* | (2019.01) |
| *G06F 16/22* | (2019.01) |
| *G06F 16/2452* | (2019.01) |

(52) U.S. Cl.
CPC ...... *G06F 16/2457* (2019.01); *G06F 16/2291* (2019.01); *G06F 16/24524* (2019.01); *G06F 16/24564* (2019.01)

(58) Field of Classification Search
CPC ............ G06F 16/2457; G06F 16/2291; G06F 16/24524; G06F 16/24564
See application file for complete search history.

(56) References Cited

U.S. PATENT DOCUMENTS

| | | | | |
|---|---|---|---|---|
| 5,675,782 A * | 10/1997 | Montague | ............. | H04L 63/101 726/4 |
| 5,911,143 A * | 6/1999 | Deinhart | ............... | G06F 21/604 707/999.009 |
| 5,925,126 A * | 7/1999 | Hsieh | .................. | G06F 21/6281 726/19 |
| 7,308,702 B1 * | 12/2007 | Thomsen | ............ | G06F 21/6236 707/999.009 |
| 7,769,859 B1 * | 8/2010 | Gaonkar | ................. | H04L 41/28 709/224 |
| 7,865,959 B1 * | 1/2011 | Lewis | ................. | G06F 21/6218 726/17 |
| 8,224,853 B2 * | 7/2012 | van Wyk | ............... | G06Q 10/06 715/224 |

(Continued)

*Primary Examiner* — Mohammed R Uddin
(74) *Attorney, Agent, or Firm* — Akona IP PC

(57) ABSTRACT

A system may include one or more tangible, non-transitory computer-readable media having stored thereon instructions, the instructions when executed to instruct one or more processors to: receive a platform-independent access binding data structure (a PIAB data structure), the PIAB data structure comprising a platform-independent representation of a subject class, a verb, an object, and a binding comprising a permission for the subject class to perform the verb on the object; convert the PIAB data structure to a first platform-specific binding for a first target platform; and cause the first platform-specific binding to be implemented on the first target platform.

20 Claims, 10 Drawing Sheets

(56) References Cited

U.S. PATENT DOCUMENTS

| | | | | |
|---|---|---|---|---|
| 8,613,070 B1* | 12/2013 | Borzycki | H04L 67/104 | 726/8 |
| 11,664,099 B1* | 5/2023 | Jain | G16H 50/20 | 705/2 |
| 11,676,075 B2* | 6/2023 | Navratil | G06F 18/2185 | 706/12 |
| 11,676,092 B1* | 6/2023 | Sicilia | G06Q 10/06393 | 705/7.39 |
| 11,677,755 B1* | 6/2023 | Shahidzadeh | H04L 63/126 | 726/7 |
| 2002/0026592 A1* | 2/2002 | Gavrila | G06F 21/6218 | 709/229 |
| 2004/0021679 A1* | 2/2004 | Chapman | G05B 19/042 | 715/700 |
| 2004/0133793 A1* | 7/2004 | Ginter | H04N 21/235 | 375/E7.009 |
| 2005/0027871 A1* | 2/2005 | Bradley | G06F 16/951 | 709/227 |
| 2007/0100830 A1* | 5/2007 | Beedubail | G06F 16/23 | 707/999.009 |
| 2008/0005115 A1* | 1/2008 | Corley | H04L 63/102 | 707/999.009 |
| 2009/0276840 A1* | 11/2009 | Cao | H04L 9/3213 | 726/9 |
| 2011/0119767 A1* | 5/2011 | Rasizade | G06F 21/10 | 726/27 |
| 2014/0143543 A1* | 5/2014 | Aikas | H04L 9/0894 | 713/168 |
| 2015/0135296 A1* | 5/2015 | Cason | G06F 21/6227 | 726/8 |
| 2015/0269383 A1* | 9/2015 | Lang | G06F 21/57 | 726/1 |
| 2015/0370621 A1* | 12/2015 | Karp | F24F 11/62 | 719/328 |
| 2017/0295181 A1* | 10/2017 | Parimi | H04L 63/1433 | |
| 2019/0253430 A1* | 8/2019 | Gamache | G06F 21/6218 | |
| 2019/0289001 A1* | 9/2019 | Milgramm | G06F 21/6236 | |
| 2019/0334724 A1* | 10/2019 | Anton | H04L 9/50 | |
| 2019/0362087 A1* | 11/2019 | Ferrans | H04L 63/102 | |
| 2019/0364051 A1* | 11/2019 | Ferrans | G06F 16/9024 | |
| 2021/0037004 A1* | 2/2021 | Gordon | H04L 63/0861 | |
| 2021/0157947 A1* | 5/2021 | Biazetti | H04L 9/3297 | |
| 2021/0232680 A1* | 7/2021 | Hecht | G06F 21/577 | |
| 2021/0342196 A1* | 11/2021 | Natarajan | H04L 41/0895 | |
| 2022/0342997 A1* | 10/2022 | Watanabe | G06F 21/62 | |
| 2023/0140181 A1* | 5/2023 | Cheng | G06F 3/0418 | 345/174 |
| 2023/0150018 A1* | 5/2023 | Hsieh | H01M 10/12 | 164/332 |

* cited by examiner

SYSTEM AND METHOD FOR PLATFORM-INDEPENDENT ACCESS BINDINGS

FIELD OF THE SPECIFICATION

The present specification relates to computer system security and more particularly, though not exclusively, to a system and method for platform-independent access bindings.

BACKGROUND

A fundamental issue in computer security is access control. Access control can include both authentication (authn) and authorization (authz). Authentication may include the process of determining that a user, device, process, or other entity is what it claims to be. Authorization may deal with issues of defining policies for what an authenticated user or entity can do on the system.

SUMMARY

A system may include one or more tangible, non-transitory, computer-readable media having stored thereon instructions, the instructions, when executed, to instruct one or more processors to: receive a platform-independent access binding data structure (a platform-independent access binding (PIAB) data structure), the PIAB data structure comprising a platform-independent representation of a subject class, a verb, an object, and a binding comprising a permission for the subject class to perform the verb on the object; convert the PIAB data structure to a first platform-specific binding for a first target platform; and cause the first platform-specific binding to be implemented on the first target platform.

BRIEF DESCRIPTION OF THE DRAWINGS

The present disclosure is best understood from the following detailed description when read with the accompanying FIGURES. According to industry practice, various features are not necessarily drawn to scale and are used for illustration purposes only. Where a scale is shown, explicitly or implicitly, it provides only one illustrative example. In other examples, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

DETAILED DESCRIPTION

Overview

Figure 1:
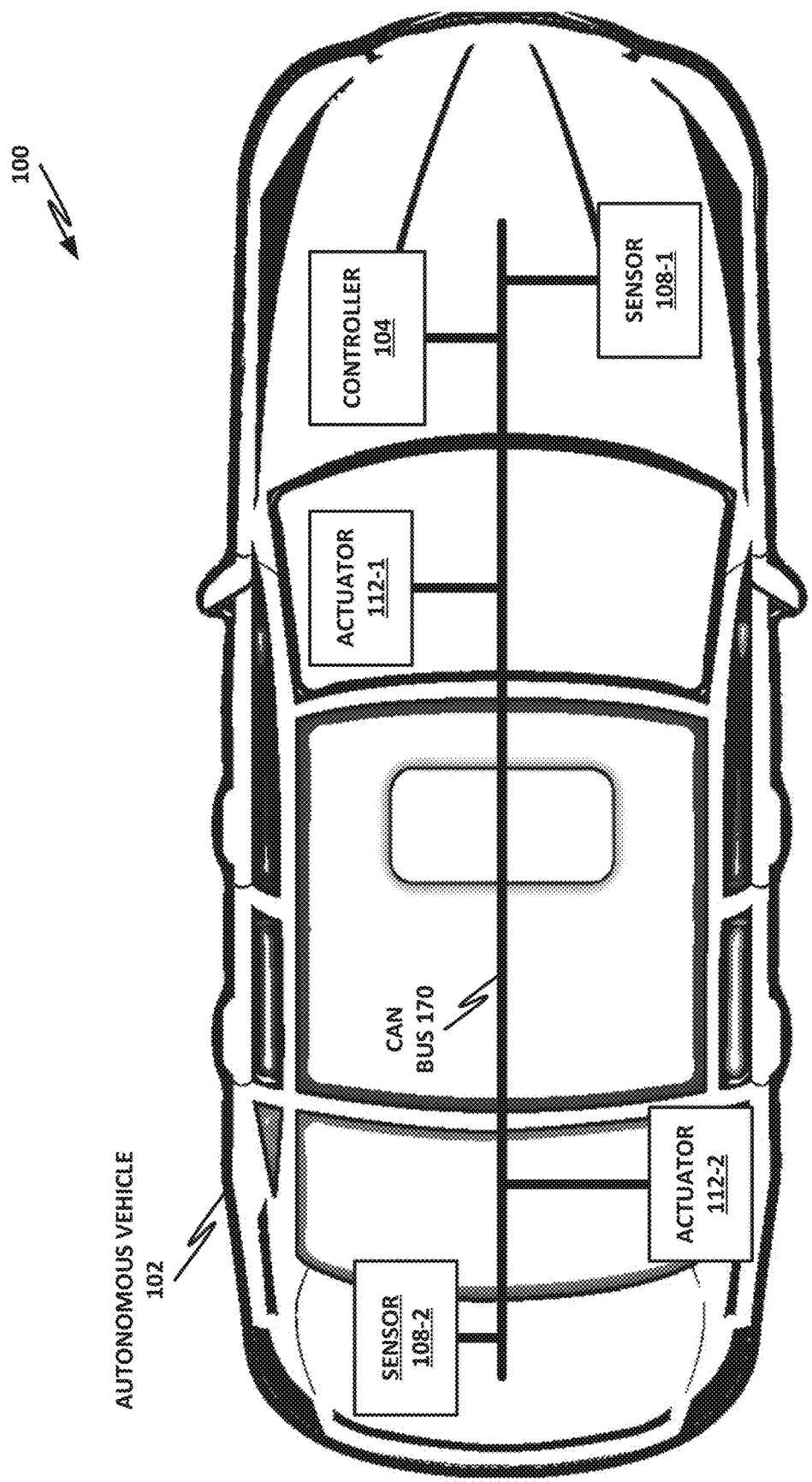
FIG. 1 is a block diagram illustrating an example autonomous vehicle.

The following disclosure provides many different examples for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various examples and/or configurations discussed. Different examples may have different advantages, and no particular advantage is necessarily required of any example.

Authentication and authorization are both critical issues in computer security. The concepts of authentication and authorization are related but independent. Strength of authentication may refer to how confident the system is that a user or entity is who or what it claims to be (i.e., identity). For example, a simple user-based authentication system that relies on a single, short password, which can be based on a dictionary word, may provide relatively weaker authentication compared to a system that uses multi-factor authentication, strong passwords, security tokens, and/or other more modern mechanisms.

Once a user or device is authenticated, authorization defines what the user, device, or entity is permitted to do on the system. For example, some Unix and Linux-based systems may provide simple username authentication with a password, which may be strong or weak depending on system policy. Once a user is authenticated, classic Unix-like systems provide a simple user and group-based authorization model. Unix permissions include read, write, and execute as the basic model. In Unix, a common protocol is "everything is a file." Thus, files, peripherals, devices, mount points, and even other machines may appear under the root file system. Files and/or directories can be assigned a set of permissions according to a file mode. Access control permissions can apply to an individual user who owns the file, a group associated with the file, and "others" (meaning everybody else authenticated on the system).

While this access protocol may be suitable for simple monolithic systems, shortcomings became evident by the 1990s. Thus, circa 2000, an extension to Linux permissions was published, known as security-enhanced Linux (SE-LINUX). SELINUX provides a much more robust and complicated access control model for individual systems.

As computer usage has moved away from the single device model—particularly in the enterprise context—newer access control protocols have also evolved. For example, networked Windows devices, such as those commonly used in enterprise office spaces, may use a distributed authentication scheme, such as Active Directory (AD). Other authentication and permission models include single sign-on (SSO) protocols, Unix pluggable authentication modules (PAM), Kerberos, and others.

As enterprises continue to evolve, even these modern solutions have run into limitations. In the present specification, a vertically integrated autonomous vehicle (AV) infrastructure ecosystem will be used as an example of a complex heterogeneous system architecture. The AV infrastructure may support, for example, a fleet of AVs, such as the one illustrated in FIG. 1 below.

A vertically integrated AV company may encounter difficulties with the highly heterogeneous environment. For example, vertical integration is often a result of acquisitions. Acquired companies may come with their own technologies and infrastructure. It may not be feasible to force these individual pieces to move to a homogeneous environment. Furthermore, some vertical pieces may simply work better with different technologies. Thus, it may be advantageous to permit different business units to use the tools and toolchains that are optimal or most nearly optimal for their workloads, which may result in a highly heterogeneous and complex ecosystem with a plurality of different incompatible authentication bindings. Heterogeneous systems may include systems, platforms, or structures that are different from one another, and that may use different access control protocols, theories, and mechanisms. Incompatible bindings present on the heterogeneous platforms may not be intended to directly map to one another, but may include abstract concepts that can be mapped to one another, such as concepts of users, permissions, actions, groups, roles, attributes, or similar.

It may be beneficial for a vertically integrated heterogeneous ecosystem to use modern access binding methods, such as role-based access controls (RBAC) or attribute-based access controls (ABAC). For example, in RBAC, a user, entity, or class may be assigned a role within the organization, and permissions for the user, entity, or class may inherit from the role. ABAC defines attributes or characteristics that can be assigned to users, environments, or resources, and assigns permissions based on those attributes.

Throughout the remainder of this specification, RBAC will be used as an operative example of the teachings herein. However, the teachings are also applicable to ABAC and other modern access control systems.

RBAC and ABAC are advantageous in that they use a subject, object, verb (e.g., an action or activity) protocol to define access controls, which are bound via roles or attributes. The definitions of subjects, objects, and verbs are essentially unrestricted. For example, in the classic Unix authentication, verbs were limited to read, write, and execute. In modern RBAC, however, an administrator can define any verb. Furthermore, an administrator can define any desired subject and object. Subjects may include, for example, individual users or teams (which may be represented as traditional users), or devices, programs, pipelines, resources, platforms, or others (which may be represented as service accounts or technical users). Objects can include files, images, peripherals, containers, virtual machines, libraries, devices (real or virtual), and others.

When integrating a large number of systems that perform access controls differently and separately, administration of access controls can quickly become an overwhelming task. It is therefore advantageous to have a single model, such as a single abstract RBAC model, that is platform-independent and that can be used as a single point of entry for mapping bindings to other systems. This single model can cut the time that it takes to provide access to the systems as well as homogenize access to various systems that might be out of sync otherwise.

Throughout this specification and in the appended claims, the term platform should be understood broadly. For example, a platform may be an individual device, such as a computer or a guest device, such as a virtual machine or a container. Platforms can also include different operating systems, different software ecosystems, remote or web-based resources, websites or web services, software packages, cloud resources, software as a service (SaaS), or any other platform that provides controlled access. These systems may have different requirements and different binding protocols. The bindings represent a model for associating a subject to an object by way of a verb with an associated permission (e.g., allow, block, verify, warn, notify, etc.). For example, if a user should be permitted to read from a file, the user is the subject, the file is the object, and the binding is a permission that allows the user to read (verb) the file. A binding may also deny access to reading the file or provide some other permission.

RBAC extends the classic permission model by defining certain roles. Again, using classic Unix authentication as an example, a binding may define a {subject, object, verb} tuple with an associated permission. Groups lower the cardinality of the subject column (multiple users may be associated with a group and inherit permission from the group). A role lowers the cardinality of the verb column (multiple verbs may be associated with a role, and users with that role have common permissions to perform those verbs on a set of objects).

In an example of a vertically integrated ecosystem, independent systems have different access control binding methodologies or schema. For example, an illustrative ecosystem may include a plurality of platforms including Google Cloud Platform (GCP), Container Engine, GitHub Enterprise, a Google Admin API, Kubernetes, Vault, Buildkite, and user workstations including Windows, Linux, and Mac workstations. In this example, GCP uses identity and access management (IAM) as its bindings model. GitHub uses a more classic permission model. The Google Admin API uses a classic permission model. Kubernetes uses RBAC. Vault is a configuration language that uses a configuration-based RBAC. Buildkite uses RBAC.

According to the present specification, a binding arbiter connects these various disparate pieces into a single heterogeneous enterprise. By way of illustration, this heterogeneous enterprise may be managed via an admin software development kit (SDK). Because manually configuring the permissions on these different systems may be difficult, the binding arbiter may operate on a single abstract RBAC binding model. In this model, RBAC bindings can be specified via a structured language, such as JavaScript Object Notation (JSON), Yet Another Markup Language (YAML), Extensible Markup Language (XML), or similar. This data structure may be referred to herein as a platform-independent access binding (PIAB) or a platform-independent role-based access control (PI-RBAC). The two terms should be considered equivalent, except that PIAB more broadly encompasses any suitable access control mechanism, such as RBAC, ABAC, or others. PI-RBAC refers specifically to a platform-independent representation of RBAC bindings.

A PIAB data structure may include various fields, such as a subject or subject class (e.g., a role may define a subject class), one or more objects, one or more verbs, and one or more bindings that include permissions for the subject to perform the verb on the object.

The binding arbiter may maintain a database of PIAB data structures, which can be centrally managed via an appropriate tool, such as Google Admin. In an illustrative system, the binding arbiter translates the PIAB data structure into platform-specific bindings for various platforms in the ecosystem. These bindings may be exported as directives to the various platforms, such as in the form of a script, sequence of instructions or API calls to carry out the bindings on the target platforms. For example, the arbiter may instantiate scripts that create users or groups on the various platforms, change user or group permissions, change access controls for various system resources, and otherwise perform platform management tasks that carry out the RBAC policy specified in the PIAB. The implementation details may be different for the various platforms because they may have their own separate binding models. However, once translations or mappings are specified for mapping the PIAB to a target system, a system administrator need not be concerned with creating specific permissions on individual platforms. Rather, the administrator can centrally specify bindings via the PIAB data structure, and the binding arbiter carries out those bindings on the various systems.

Furthermore, in certain examples, the binding arbiter may manage credentials for individual users and act as an SSO for subjects in the ecosystem. Thus, a user may not need to memorize passwords for the different platforms or carry separate authentication tokens or credentials. Rather, the binding arbiter may use a strong authentication mechanism, such as Okta, to authenticate users or other subjects. The binding arbiter may programmatically create credentials for the subjects on the various target platforms. In an example, the binding arbiter may optionally use the strongest authentication mechanism available for the platform, such as by using a password of the maximum length with the maximum available amount of entropy, using two-factor authentication, or otherwise taking steps to secure the transactional path between the binding arbiter and the target platform. In general terms, the strongest authentication mechanism may be defined as the mechanism with the most security measures or with the strictest parameters.

Any authentication credentials, passwords, or tokens may be stored in an encrypted database to which users may not have direct access. Rather, when the user authenticates to the binding arbiter, the binding arbiter may decrypt entries in the encrypted database and fetch the credentials as necessary.

In an illustrative example, just-in-time (JIT) authentication can be provided. For example, if the user executes a pipeline, before executing stages of the pipeline, the system may authenticate to a target platform, perform necessary steps on the target platform, and once the target platform is no longer required, the system may clean up authentication, such as logging out or expiring sessions. Thus, the system is not left vulnerable with stale authentication.

Authentication can be illustrated by way of a software build pipeline, which may include a continuous integration and continuous delivery (CI/CD) system or similar. For example, Buildkite is a build system that may be used to build containers, among other tasks. These containers can be deployed as microservices or to carry out discrete functions in an ecosystem, such as a vertically integrated ecosystem. Containers can be specified in various layers, and layers may need to fetch different resources. As Buildkite builds a container, the binding arbiter may authenticate to the various platforms that provide the resources using JIT authentication, fetch the necessary resources, build the container, and revoke stale authentications, which can provide the user with an SSO that makes it easier to perform the various tasks and enhances security of the overall system.

DETAILED DESCRIPTION OF THE DRAWINGS

A system and method for providing platform-independent access bindings will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various examples disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram 100 illustrating an example AV 102. AV 102 is an illustration of a system that may benefit from the infrastructure services of the present specification. For example, an AV enterprise may be vertically integrated and may include a complex and heterogeneous group of systems. Thus, maintaining systems to support AV 102 may include a nontrivial task of managing access bindings.

AV 102 may be, for example, an automobile, car, truck, bus, train, tram, funicular, lift, or similar. AV 102 may also be an autonomous aircraft (fixed wing, rotary, or tiltrotor), ship, watercraft, hovercraft, hydrofoil, buggy, cart, golf cart, recreational vehicle, motorcycle, off-road vehicle, three- or four-wheel all-terrain vehicle, or any other vehicle. Except to the extent specifically enumerated in the appended claims, the present specification is not intended to be limited to a particular vehicle or vehicle configuration.

In this example, AV 102 includes one or more sensors, such as sensor 108-1 and sensor 108-2. Sensors 108 may include, by way of illustrative and nonlimiting example, localization and driving sensors, such as photodetectors, cameras, radio detection and ranging (RADAR), sound navigation and ranging (SONAR), light detention and ranging (LIDAR), global positioning system (GPS), inertial measurement units (IMUS), synchros, accelerometers, microphones, strain gauges, pressure monitors, barometers, thermometers, altimeters, wheel speed sensors, computer vision systems, biometric sensors for operators and/or passengers, or other sensors. In some examples, sensors 108 may include cameras implemented using high-resolution imagers with fixed mounting and field of view. In further examples, sensors 108 may include LIDARs implemented using scanning LIDARs. Scanning LIDARs have a dynamically configurable field of view that provides a point-cloud of the region intended to scan. In still further examples, sensors 108 includes RADARs implemented using scanning RADARs with a dynamically configurable field of view.

AV 102 may further include one or more actuators 112. Actuators 112 may be configured to receive signals and to carry out control functions on AV 102. Actuators may include switches, relays, or mechanical, electrical, pneumatic, hydraulic, or other devices that control the vehicle. In various examples, actuators 112 may include steering actuators that control the direction of AV 102, such as by turning a steering wheel or controlling control surfaces on an air or watercraft. Actuators 112 may further control motor functions, such as an engine throttle, thrust vectors, or others. Actuators 112 may also include controllers for speed, such as an accelerator. Actuators 112 may further operate brakes or braking surfaces. Actuators 112 may further control headlights, indicators, warnings, a car horn, cameras, or other systems or subsystems that affect the operation of AV 102.

A controller 104 may provide the main control logic for AV 102. Controller 104 is illustrated here as a single logical unit and may be implemented as a single device, such as an electronic control module (ECM) or other. In various examples, one or more functions of controller 104 may be distributed across various physical devices, such as multiple ECMs, one or more hardware accelerators, artificial intelligence (AI) circuits, or others.

Controller 104 may be configured to receive from one or more sensors 108 data to indicate the status or condition of AV 102, as well as the status or condition of certain ambient factors, such as traffic, pedestrians, traffic signs, signal lights, weather conditions, road conditions, or others. Based on these inputs, controller 104 may determine adjustments to be made to actuators 112. Controller 104 may determine adjustments based on heuristics, lookup tables, AI, pattern recognition, or other algorithms.

Various components of AV 102 may communicate with one another via a bus, such as controller area network (CAN) bus 170. CAN bus 170 is provided as an illustrative example, but other types of buses may be used, including wired, wireless, fiberoptic, infrared, WiFi, Bluetooth, dielectric waveguides, or other types of buses. Bus 170 may implement any suitable protocol. For example, in some cases, bus 170 may use transmission control protocol (TCP) for connections that require error correction. In cases where the overhead of TCP is not preferred, bus 170 may use a one-directional protocol without error correction, such as user datagram protocol (UDP). Other protocols may also be used. Lower layers of bus 170 may be provided by protocols, such as any of the family of Institute of Electrical and Electronics Engineers (IEEE) 802 family of communication protocols, including any version or subversion of 802.1 (higher layer local area network (LAN)), 802.2 (logical link control), 802.3 (Ethernet), 802.4 (token bus), 802.5 (token ring), 802.6 (metropolitan area network), 802.7 (broadband coaxial), 802.8 (fiber optics), 802.9 (integrated service LAN), 802.10 (interoperable LAN security), 802.11 (wireless LAN), 802.12 (100BaseVG), 802.14 (cable modems), 802.15 (wireless personal area network, including Bluetooth), 802.16 (broadband wireless access), or 802.17 (resilient packet ring) by way of illustrative and nonlimiting example. Non-IEEE and proprietary protocols may also be supported, such as InfiniBand, FibreChannel, FibreChannel over Ethernet (FCoE), Omni-Path, Lightning bus, or others. Bus 170 may also enable controller 104, sensors 108, actuators 112, and other systems and subsystems of AV 102 to communicate with external hosts, such as internet-based hosts. In some cases, AV 102 may form a mesh or other cooperative network with other AVs, which may allow sharing of sensor data, control functions, processing ability, or other resources.

Figure 10:
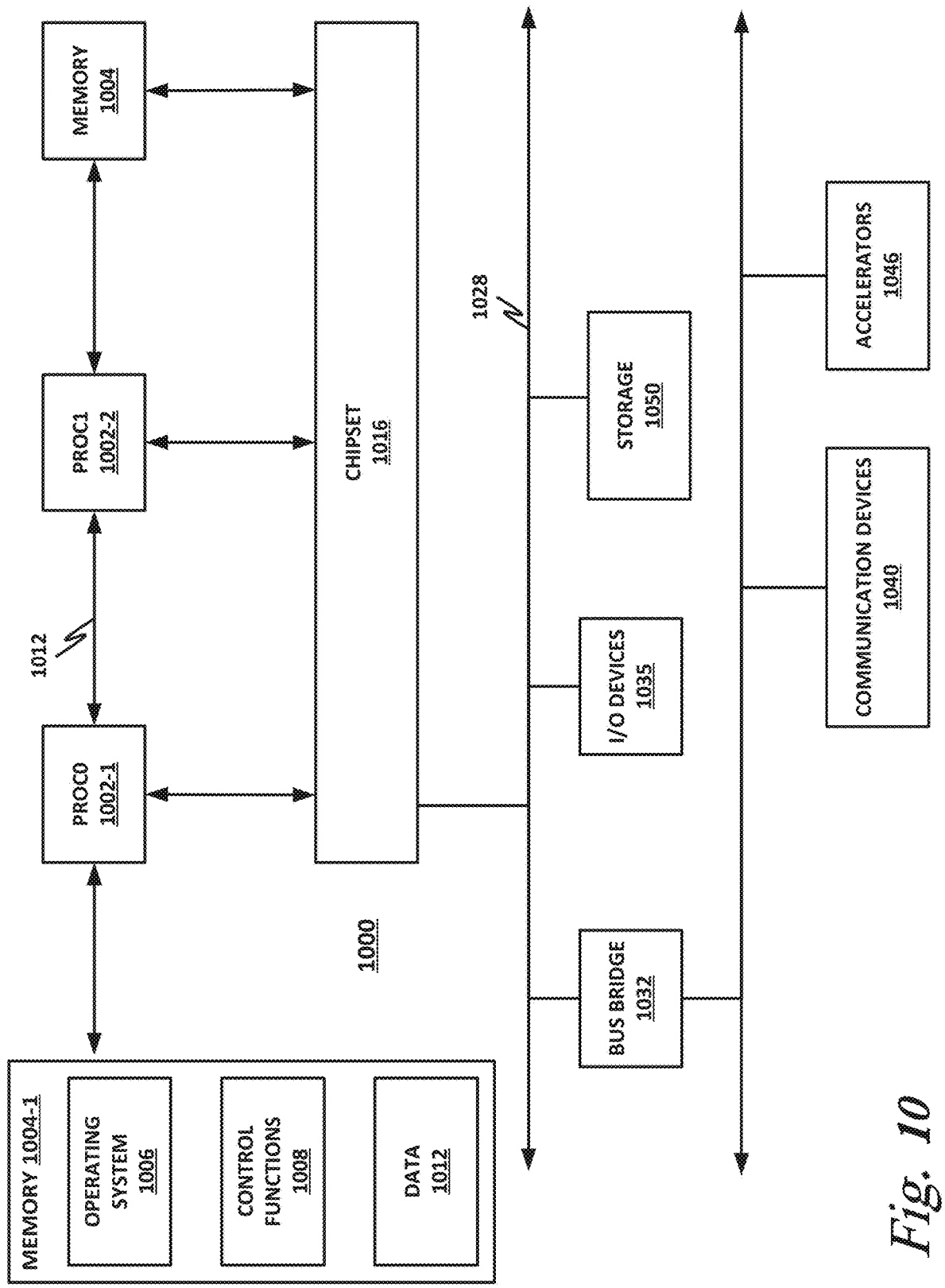
FIG. 10 is a block diagram of selected elements of a hardware platform.

Controller 104 may control the operations and functionality of AVs 102 or one or more other AVs. Controller 104 may receive sensed data from sensors 108 and make onboard decisions based on the sensed data. In some cases, controller 104 may also offload some processing or decision-making, such as to a cloud service or accelerator. In some cases, controller 104 is a general-purpose computer adapted for input/output (I/O) communication with vehicle control systems and sensor systems. Controller 104 may be any suitable computing device. An illustration of a hardware platform is shown in FIG. 10, which may represent a suitable computing platform for controller 104. In some cases, controller 104 may be connected to the internet via a wireless connection (e.g., via a cellular data connection). In some examples, controller 104 is coupled to any number of wireless or wired communication systems. Controller 104 may be coupled to one or more communication systems via a mesh network of devices, such as a mesh network formed by AVs.

According to various implementations, AV 102 may modify and/or set driving behavior in response to parameters set by vehicle passengers (e.g., via a passenger interface) and/or other interested parties (e.g., via a vehicle coordinator or a remote expert interface). Driving behavior of an AV may be modified according to explicit input or feedback (e.g., a passenger specifying a maximum speed or a relative comfort level), implicit input or feedback (e.g., a passenger's heart rate), or any other suitable data or manner of communicating driving behavior preferences.

AV 102 is illustrated as a fully autonomous automobile but may additionally or alternatively be any semi-autonomous or fully autonomous vehicle. In some cases, AV 102 may switch between a semi-autonomous state and a fully autonomous state and thus some autonomous vehicles may have attributes of both a semi-autonomous vehicle and a fully autonomous vehicle depending on the state of the vehicle.

Figure 2:
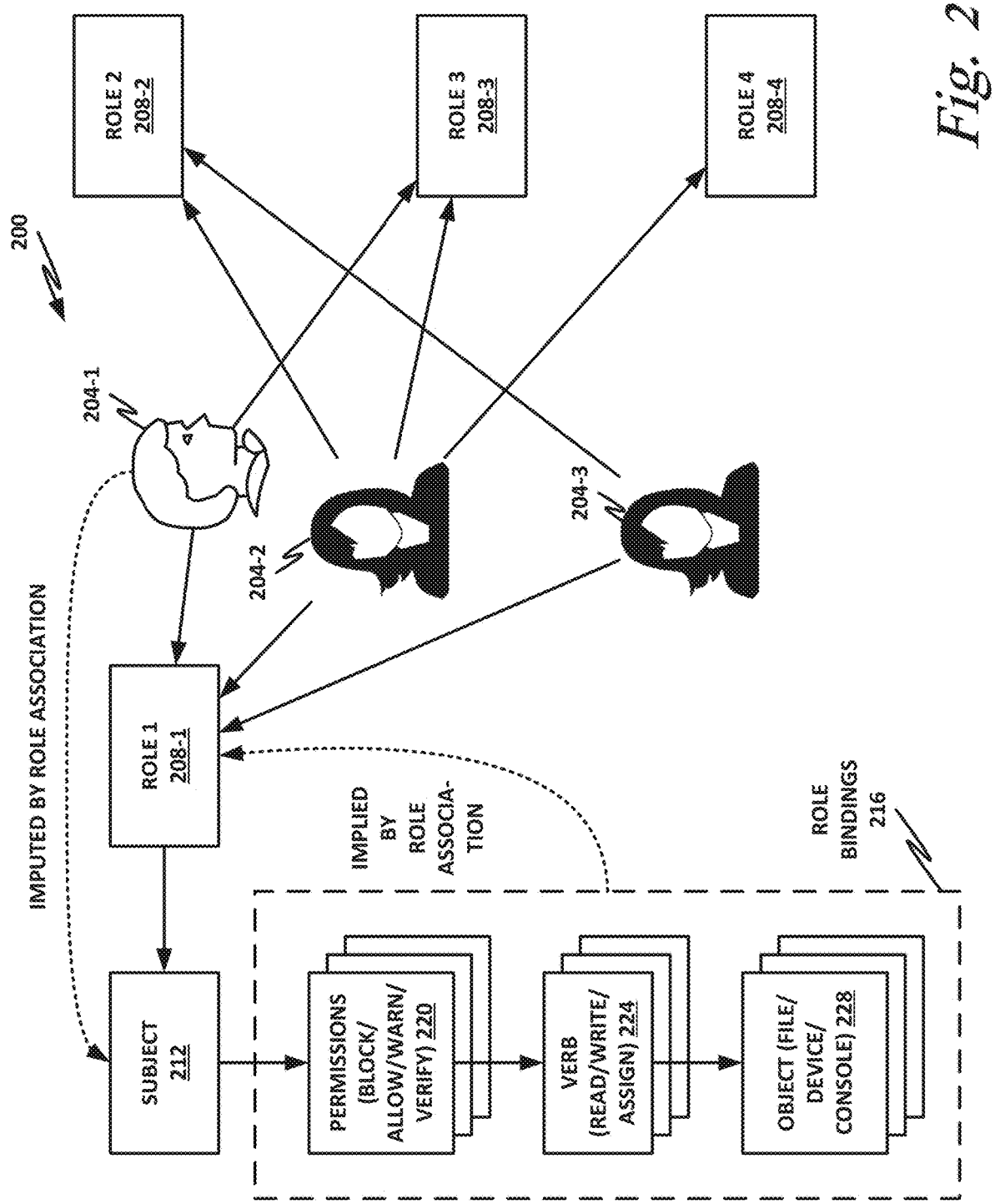
FIG. 2 is a block diagram illustration of selected aspects of a role-based access controls (RBAC) ecosystem.

FIG. 2 is a block diagram illustration of selected aspects of an RBAC ecosystem 200. RBAC ecosystem 200 includes a plurality of users, namely users 204-1, 204-2, and 204-3. Users may also be assigned to various groups in many-to-many relationships. For example, users 204-1 and 204-2 may belong to a "System Administrators" group, and users 204-2 and 204-3 may belong to a "Software Developers" group. Users 204 (or groups) may be assigned various roles 208, such as role 1 208-1, role 2 208-2, role 3 208-3, and role 4 208-4. The mappings between users/groups and roles may be a many-to-many relationship. For example, user 204-1 has role 1 208-1 and role 3 208-3 but not role 2 208-2 or role 4 208-4. Other roles and bindings may be provided.

Roles 208 may also have a many-to-many relationship with various role bindings 216. Role bindings 216 are used, for example, to reduce the cardinality of certain verbs 224 and/or objects 228 by associating them with certain roles.

In particular, role bindings 216 include a number of permissions 220 that may be associated with a verb 224 acting on an object 228. Verb 224 is to be performed by a subject 212. The permissions of role binding 216 may include such permissions as allow, block, warn, verify, notify, or other actions. An advantage of an RBAC ecosystem 200 is the ability to define permissions 220, verbs 224, and objects 228 without being restricted to a fixed set of permissions, verbs, and objects. Thus, a system administrator can manage RBAC ecosystem 200 according to the best practices of a specific enterprise. Role bindings 216 may be specified, for example, in a PIAB data structure, which may be a structured text format and which may be platform-independent.

Figure 3:
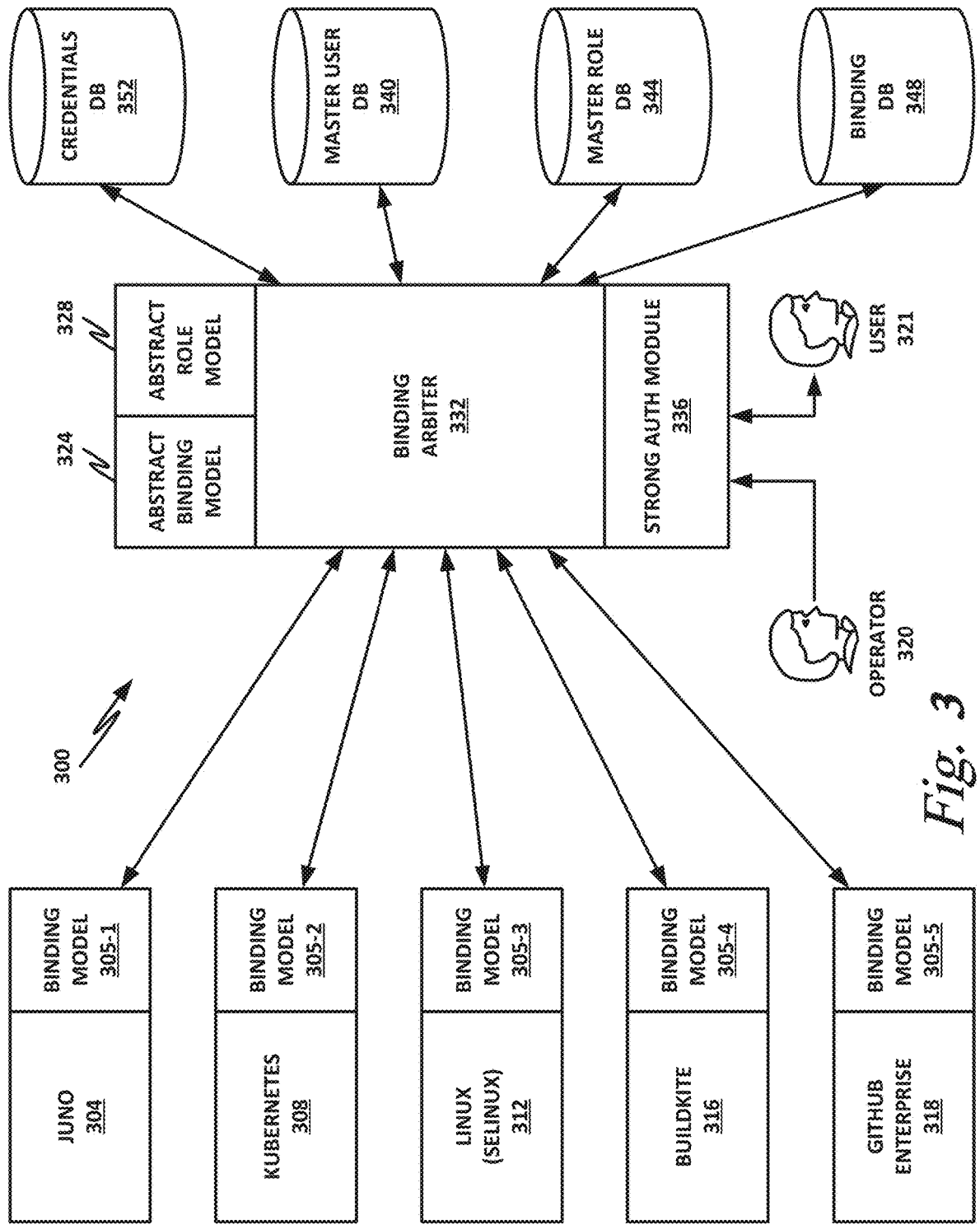
FIG. 3 is a block diagram of selected elements of a complex heterogeneous ecosystem.

FIG. 3 is a block diagram of a complex heterogeneous ecosystem 300. Complex heterogeneous ecosystem 300 may be provided for any suitable purpose and, by way of illustrative example, is provided as a support infrastructure for a vertically integrated AV ecosystem. Ecosystem 300 may include a number of different platforms with different access binding models. For example, a Juno platform 304 is provided with a binding model 305-1. A Kubernetes platform 308 is provided with binding model 305-2. Linux workstations with SELINUX capabilities 312 are provided with binding model 305-3. A Buildkite environment 316 is provided with binding model 305-4. A GitHub enterprise environment 318 is provided with binding model 305-5. Other platforms, as illustrated herein, may also be provided, such as Windows workstations, Mac workstations, Linux or Unix workstations, virtual machines, servers, virtualization platforms, such as OpenStack, other software development environments, other container management systems, and other build environments. The term platform, as used herein, should be understood to refer to any software environment that provides a binding model 305 for managing access to platform resources (objects).

Various users, such as user 321 and operator 320, are provided within ecosystem 300 and may need to access various services on the illustrated platforms. For example, user 321 may wish to define a project via Juno that may deploy a container to be managed via Kubernetes, built with Buildkite, pulling source code from GitHub, with user 321 performing work on a Linux workstation. These various platforms may require their own binding models.

Because these various platforms are managed by one or more operators 320, the operators may need to specify binding models for individual systems to carry out the purposes of the vertically integrated enterprise, which can become a cumbersome task and can become a roadblock to efficiency within the enterprise. Thus, rather than manually specifying individual access bindings for platforms, operator 320 may authenticate to binding arbiter 332 via strong authentication module 336. Operator 320 may build abstract binding models 324 and abstract role models 328 to specify various roles and bindings within the complex ecosystem. Binding arbiter 332 may include intelligence to translate those bindings into the necessary access bindings for the individual platforms and their binding models 305. Thus, binding arbiter 332 may translate abstract binding model 324 and abstract role model 328 into a platform-specific binding for binding model 305-1. Binding arbiter 332 may export the bindings to Juno platform 304, such as via scripts or other instructions that will carry out the binding model. Binding arbiter 332 may also export bindings for binding model 305-2, binding model 305-3, binding model 305-4, and binding model 305-5. These binding models are provided by way of illustrative and nonlimiting example only, and other binding models may also be used.

Binding arbiter 332 may maintain a number of databases, such as a credentials database 352, a master user database 340, a master role database 344, and a bindings database 348. When user 321 authenticates to binding arbiter 332 via strong authentication module 336, binding arbiter 332 may query credential database 352 to identify credentials for user 321 for the various platforms in the ecosystem. Thus, binding arbiter 332, or a submodule thereof, may act as a SSO service for the enterprise. Rather than user 321 authenticating directly to the individual platforms, binding arbiter 332 may authenticate to the platforms on behalf of user 321. User 321 may perform work, such as executing a pipeline, that uses one or more of the platforms in the complex ecosystem. Binding arbiter 332 may provide JIT authentication to those individual platforms so that they are available when the pipeline needs them and may terminate stale authentication once the pipeline is finished to provide greater security.

Figure 4:
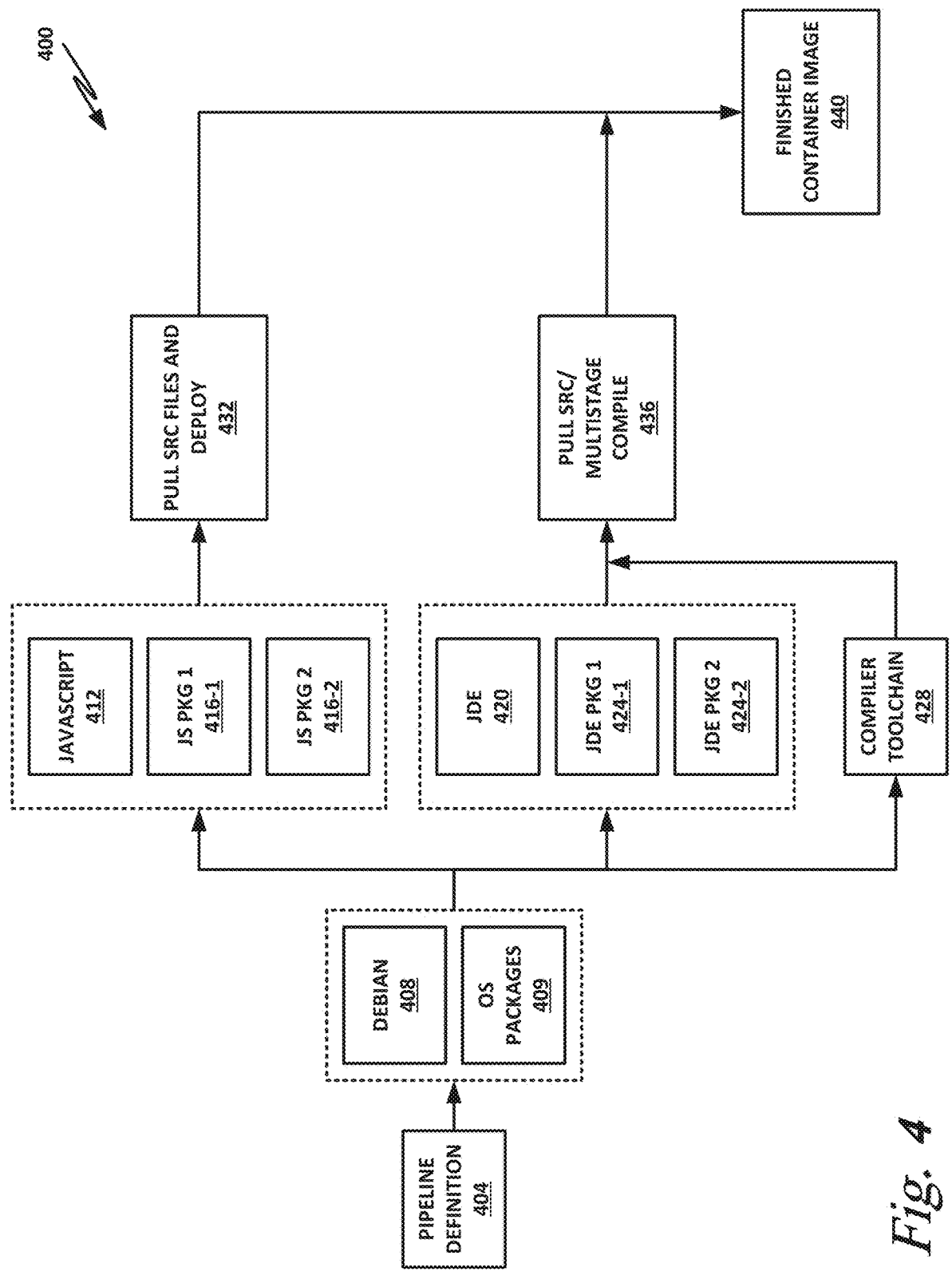
FIG. 4 is a block diagram illustration of selected elements of a pipeline.

FIG. 4 is a block diagram illustration of a pipeline 400 that may be executed, for example, via Buildkite or similar. Pipeline 400 may be used as a software build pipeline to build a container that runs a particular service or microservice for the enterprise. In older systems, software builds might have been managed by a simpler system, such as the Unix "make" program and associated makefiles. These might use more naïve Unix-style access controls to access files on the local file system to build the software.

In a modern distributed enterprise, such a simple and straightforward system may not be practical. For example, pipeline 400 may build a container that runs on a Debian Linux operating system. A well-constructed container may include several layered build steps with the results of layers cached, so that when a container is rebuilt, only those layers that have changed are rebuilt. This build operation is similar to the way the make program manages object files and compiles only those modules that have changed when rebuilding a particular software system.

Pipeline 400 may include complex interactions, such as downloading an operating system (OS) image from a web resource (such as Docker Hub), which may or may not require authentication. It may download packages from package repositories. It may also download images of development environments, such as Java, using a platform such as Artifactory. It may pull files from local resources and may require access to other objects. These steps may require interacting with various access control ecosystems provided by the platforms that manage the necessary resources.

Pipeline 400 may be built via a build system, such as Buildkite. In this case, a pipeline definition 404 is provided, such as in a structured text file, like pipeline.yml. Pipeline.yml defines various build pieces or layers, some of which may be performed in parallel.

For example, Buildkite may first pull a Debian image 408 and pull a number of OS packages via a package manager, such as apt-get. Once the OS image has been pulled and the appropriate package installed, certain software systems may be deployed in parallel. For example, the target package may require JavaScript for a frontend and Java for a backend. Furthermore, the backend may be compiled into either bytecode or via a cross compiler into machine code.

The JavaScript environment 412, Java development environment 420, and compiler toolchain 428 may be pulled in parallel. These may be docker images or they may be installed via source or binary repositories, or via other suitable methods.

JavaScript environment 412 relies on several JavaScript packages, namely JavaScript package 1 416-1 and JavaScript package 2 416-2. Java development environment (JDE) 420 relies on Java package 1 424-1 and Java package 2 424-2. Compiler toolchain 428 may also rely on software packages or utilities. These can be pulled and integrated into the container in parallel by Buildkite.

After Buildkite has finished with JavaScript environment 412, it may serially pull files (e.g., source files), such as from a file repository or other resource. These may be frontend files 432 that can be pulled and deployed as the frontend user interface of a service provided by the docker image.

After building JDE 420 and compiler toolchain 428, Buildkite may pull additional resources, files, source code, or data and perform a multistage compile 436, which compiles the Java code into a usable executable or bytecode.

Once these steps have been completed, in block 440, Buildkite has finished building the container image.

An advantage of Buildkite is that it includes intelligence to know which pieces can be built in parallel and to build those in parallel, which can save substantial time when building an image versus building the image serially.

In this illustration, stages of the build and blocks of the build may require access to different platforms that provide different resources or objects. These may have their own binding models. Thus, in this example, Buildkite (as a platform) may itself be a subject in an RBAC ecosystem with the role of "container build." The container build role may have associated therewith certain bindings and certain objects and verbs that are appropriate for the build role. Because the various platforms have different binding models, the use of a binding arbiter to simplify deploying those binding models may be advantageous.

Figure 5:
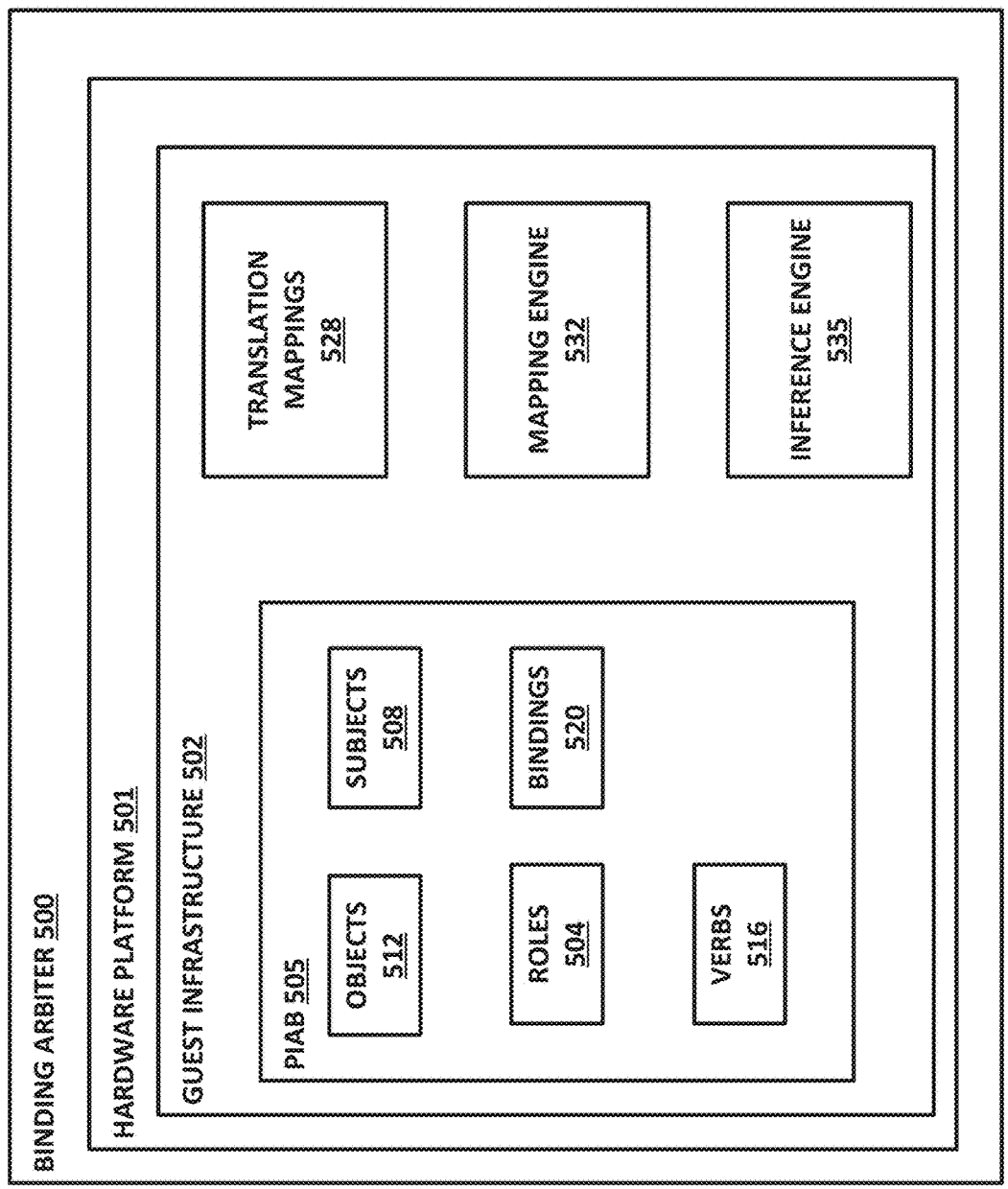
FIG. 5 is a block diagram of selected elements of a binding arbiter.

FIG. 5 is a block diagram of selected elements of a binding arbiter 500. Binding arbiter 500 may be hosted on a hardware platform 501, which may optionally provide guest infrastructure 502, such as a virtualization or containerization infrastructure. Thus, the various functional blocks illustrated in binding arbiter 500 may be understood to be logical rather than specifying a particular hardware or software configuration. These may be software modules, libraries, microservices, virtual machines, or any other suitable functionality.

Binding arbiter 500 provides platform-independent access bindings 505, which may be represented as structured text in some examples. For example, these may be YAML, JSON, XML, or some other similar structured text format. Binding arbiter 500 provides translation mappings 528 that mapping engine 532 can use to translate PIAB 505 into platform-specific bindings that can be implemented on concrete systems.

PIAB 505 provides a role-based binding system in the present example. Other types of binding models may also be used. In the role-based example, PIAB 505 includes one or more roles 504. Various subjects 508, objects 512, and verbs 516 may be associated with these roles. The use of roles can help to simplify access controls by reducing cardinality in the subjects and verbs. PIAB 505 may also include bindings 520 that associate certain permissions with the various roles 504.

A system operator can specify roles and bindings in the PIAB data structure and may operate mapping engine 532 to export those bindings to various target systems. Binding arbiter 500 may query translation mappings 528 to identify individual mappings for various target platforms. Mapping engine 532 uses translation mappings 528 to translate PIAB 505 into a set of concrete steps or actions that can be taken on the target platform to realize the bindings specified in PIAB 505. Mapping engine 532 may export those actions, such as in the form of a script or other commands, to the target platforms and cause them to be carried out on the target platforms, which provides the concrete platform-specific mappings on the individual target platforms that correspond to the PIAB specification on binding arbiter 500.

Inference engine 535 may be provided to infer appropriate mappings for platforms. For example, based on PIAB 505, inference engine 535 may infer which platforms are used by a particular role and which objects on that platform are required for the role. Thus, it may be unnecessary for an operator to manually specify specific platforms. Platforms, objects, verbs, and bindings may be inferred (at least in part) from the role.

Figure 6:
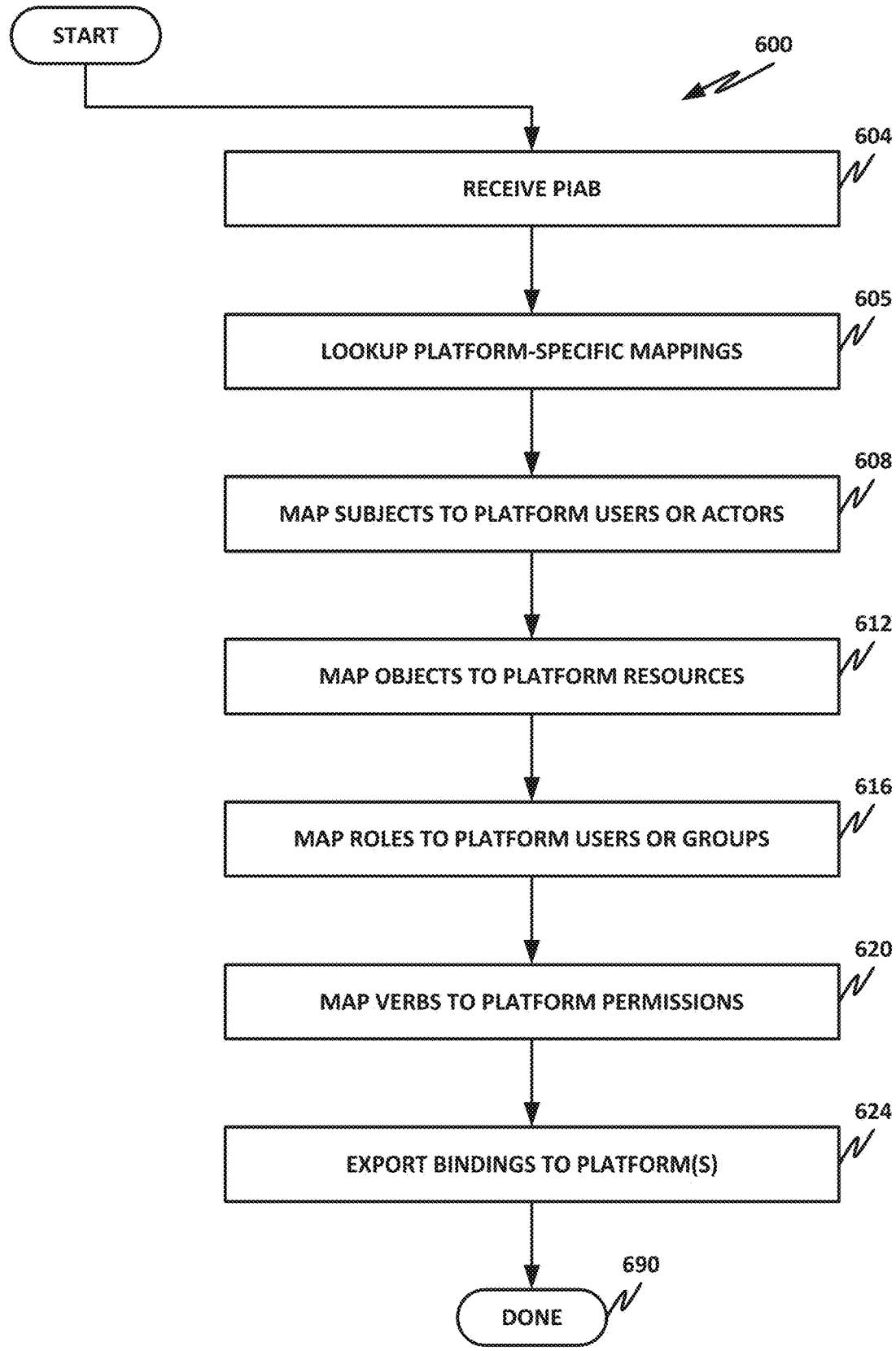
FIG. 6 is a flowchart of a method for translating a platform-independent access binding (PIAB) data structure into a concrete binding for a target platform.

FIG. 6 is a flowchart of a method 600 for translating a PIAB data structure into a concrete binding for a target platform.

In block 604, the binding arbiter, or some other appropriate module, receives a PIAB data structure. The PIAB data structure may be in a structured text format and may be platform-independent, meaning it is not intended to provide concrete bindings for any particular or specific platform. Rather, the PIAB may be intended to specify access bindings in an abstract or a platform-independent way.

In block 605, the binding arbiter may look up an appropriate platform-specific mapping for a particular target platform.

In block 608, the system may map subjects in the PIAB data structure to platform users or actors according to the platform-specific binding model.

In block 612, the system may use the platform-specific mappings to map objects in the platform-independent binding model to specific platform resources or other types of objects on the platform.

In block 616, the binding arbiter may use the platform-specific mappings to map specific roles to platform users or groups.

In block 620, the binding arbiter may use the platform-specific mappings to map verbs in the platform-independent bindings to certain platform action permissions, such as read, write, execute, list, control, share, or similar.

After block 620, the system has provided platform-specific bindings that conform to the platform-specific binding model for the target platform. Thus, in block 624, the system may export the bindings to one or more platforms where the bindings may be implemented as concrete bindings on those target platforms.

In block 690, the method is done.

Figure 7:
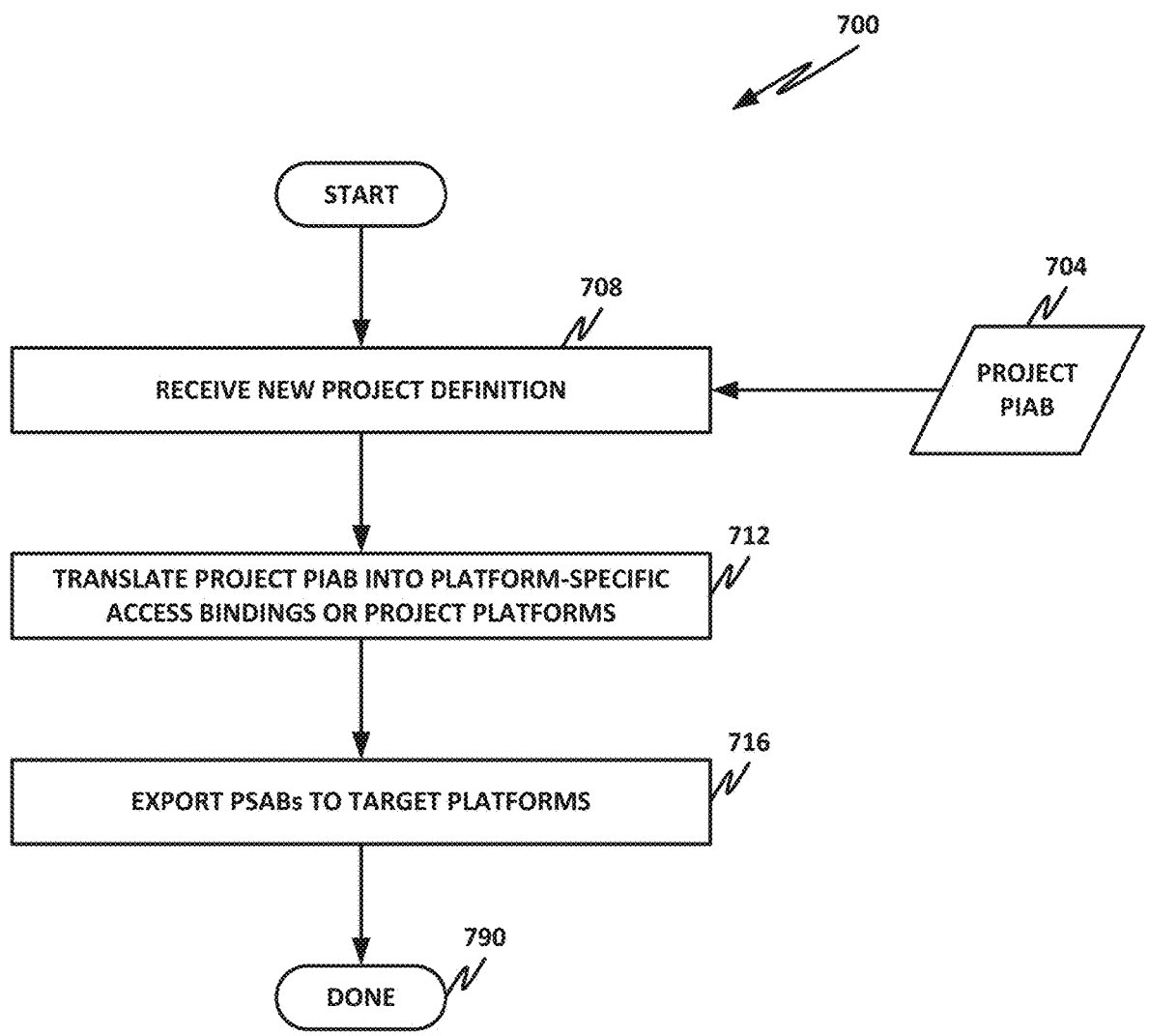
FIG. 7 is a flowchart of selected elements of a method of onboarding a new project into a binding arbiter.

FIG. 7 is a flowchart of a method 700 of onboarding a new project into a binding arbiter. In this case, a project administrator may specify a project PIAB 704. Project PIAB 704 may use structured text to indicate an abstract binding model, which may include roles to be specified by the project, as well as resources or objects required by the project. These resources may be available from various systems that have their own individual platform-specific binding models. However, the project administrator may not want to worry about specifying individual bindings for those individual platforms. Rather, the project administrator wants to specify roles, assign users to those roles, and indicate which objects and verbs are associated with those roles. The binding arbiter may include the intelligence to infer from the RBAC model which platforms are required to provide the objects and which bindings are needed to provide appropriate access to the resources of those platforms. Thus, in block 708, the binding arbiter receives a new project definition, including a project PIAB 704.

In block 712, the binding arbiter may translate the project PIAB into platform-specific access bindings for platforms that are used by the project, which may include the intelligence to infer which platforms provide the necessary objects and which bindings are necessary to carry out the purposes of the project on those platforms.

In block 716, the binding arbiter may build platform-specific access bindings (PSAB) for one or more target platforms. The binding arbiter may export the PSAB to the target platforms and cause those platforms to carry out the bindings, which may be in the form of sending commands, scripts, directives, configuration files, or similar instructions to the target platforms to carry out the specific bindings.

In block 790, the method is done.

Figure 8:
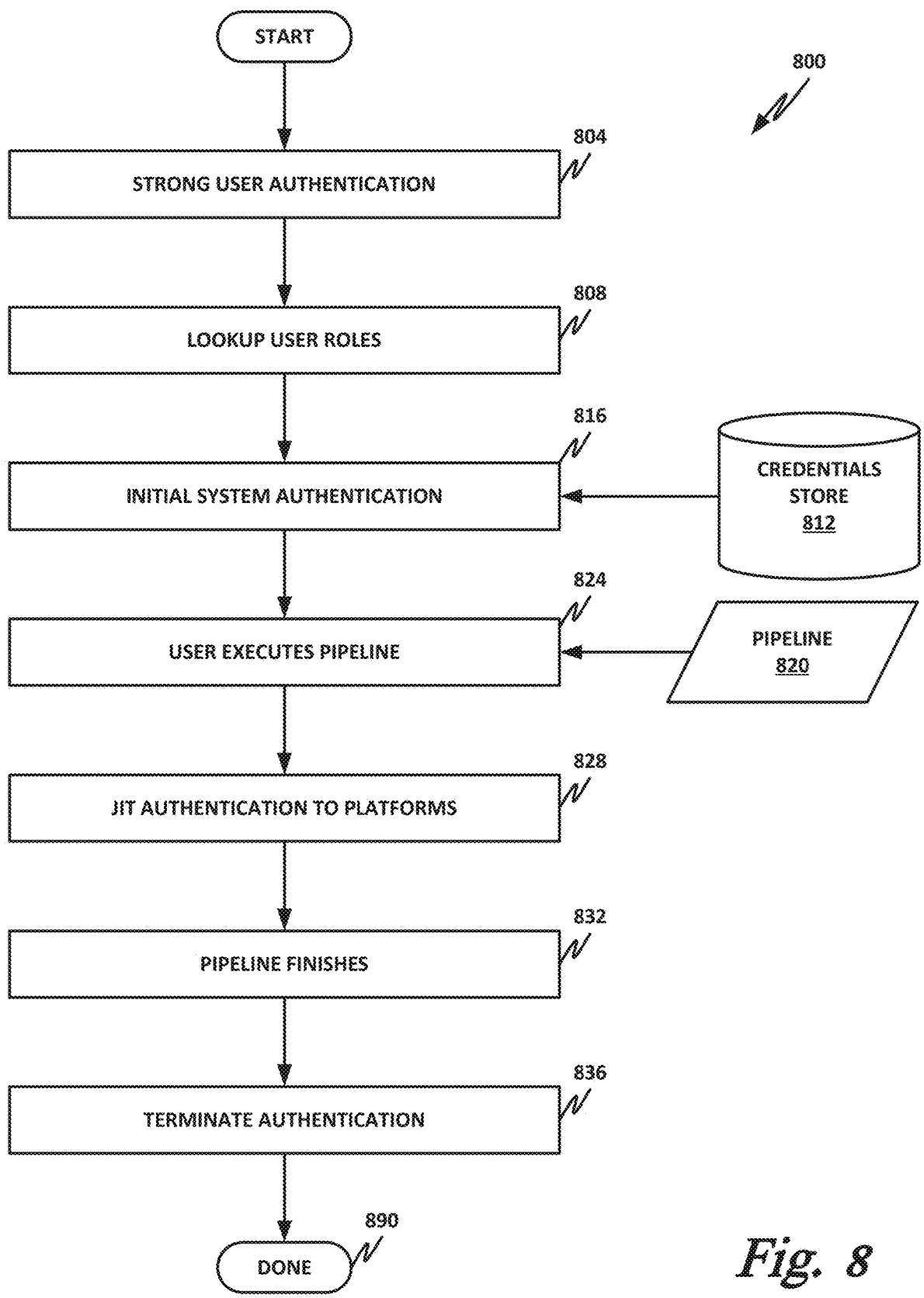
FIG. 8 is a flowchart of selected elements of a method of providing credential management.

FIG. 8 is a flowchart of a method 800 of providing credential management.

As discussed above, in addition to binding arbitration, the binding arbiter, or some other software system, may also provide authentication management, which can provide a SSO solution for the users and can increase security of the system by not requiring (or even allowing, in some cases) users to manage their own credentials on individual target systems.

In block 804, the system may provide strong user authentication, such as multi-factor authentication and/or cryptographic verification. For example, in an illustration, Okta may be used as an authentication frontend. In some cases, Okta, or a similar strong authentication solution, may also be used as a frontend replacement for the user's authentication to the workstation or other device. For example, a stock login screen or prompt may be replaced with an interface that hooks into a strong authentication tool like Okta.

In block 808, the binding arbiter may query a roles database to look up certain roles associated with the user, which may inform the arbiter of which bindings need to be implemented for the user.

In block 816, the system may query credentials store 812 for initial system authentications, which can include authenticating the systems that need to be accessed as part of the normal workflow as opposed to JIT authentication for other workflows, such as pipelines.

In block 824, the user may execute a pipeline 820, or some other similar task, that may require authentications in addition to the normal authentications that were provided in block 816.

In block 828, as the pipeline executes, the system may provide JIT authentication to the various platforms that provide resources required by the pipeline. Note that the JIT authentication may be intelligent enough to recognize that there may be some latency in the authentication and that waiting until the very moment the resource is required may not be optimal. Thus, the JIT authentication may be intelligent enough to compensate for authentication latency.

In block 832, the pipeline may finish executing.

In block 836, the system may terminate stale authentications, which can help to enhance security. Terminating stale authentications may include logging out of systems or, in the case of web resources, logging in without saving session data. Terminating authentications can also include terminating sessions to ensure that stale authentications are not maintained.

In block 890, the method is done.

Figure 9:
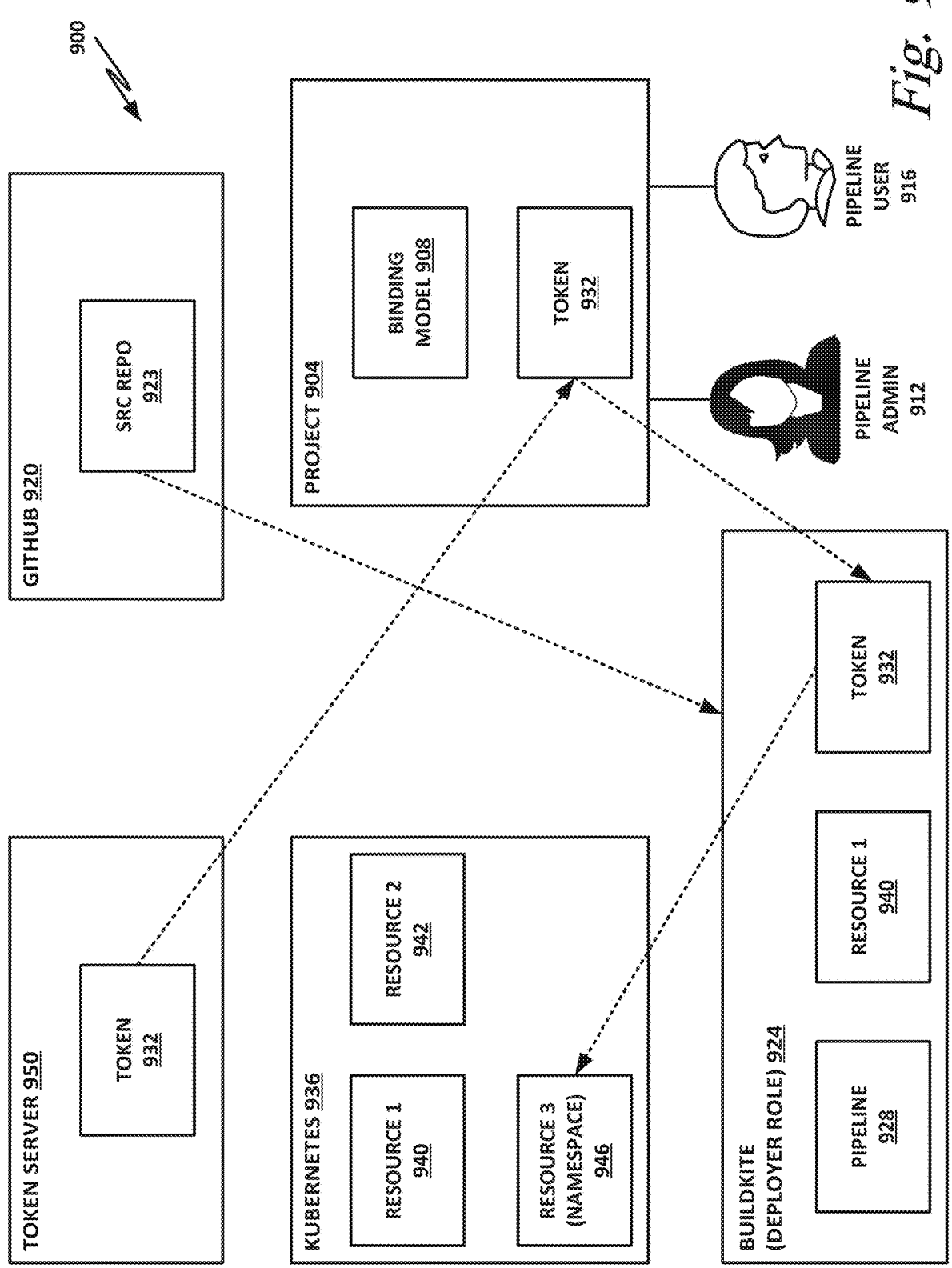
FIG. 9 is a block diagram illustration of selected elements of a complex heterogeneous ecosystem.

FIG. 9 is a block diagram illustration of selected elements of a complex heterogeneous ecosystem. FIG. 9 illustrates certain resource allocations that may be required in execution of a pipeline. In this case, a project 904 is defined in an appropriate system, such as Juno or similar. Project 904 includes a binding model 908, which may provide, for example, a platform-independent specification of bindings required by the project. Binding model 908 may be specified by a pipeline admin 912, with pipeline admin 912 itself being a role in the RBAC ecosystem. Pipeline user 916 may need to execute the pipeline to perform business tasks. Thus, binding model 908 may be exported to a binding arbiter, such as the binding arbiter illustrated in FIG. 3, to export the bindings to various target platforms.

In this illustration, Buildkite may be designated with a deployer role in the binding ecosystem, or in other words, the Buildkite platform is a subject in the RBAC ecosystem and may perform verbs on objects hosted on other platforms in the ecosystem. Buildkite 924 includes pipeline 928. Pipeline 928 may be to build a docker container that provides a microservice. When pipeline user 916 changes source code in certain portions of the container, the container may need to be rebuilt and redeployed.

Buildkite 924 may require access to GitHub 920, which provides a source repository 923, which includes the code that the user changed. Buildkite 924 may also need to interact with Kubernetes 936, which provides resource 1 940, resource 2 942, and resource 3 946. Resource 3 946 is in namespace 1, and Kubernetes controls access to namespace 1 via a token authentication mechanism. A token 932 is provided by token server 950, which may run on Vault or similar.

When pipeline user 916 changes source code, those changes may be committed to source repository 923. Pipeline user 916 may then execute pipeline 928.

Buildkite 924 authenticates to GitHub 920 to get the source code from source repository 923. Buildkite 924 may execute a container build pipeline, such as the one illustrated in FIG. 4 above.

As part of the build pipeline, Buildkite 924, acting in the deployer role, may need to perform verbs on resource 3 946 in namespace 1. Thus, Buildkite 924 is a technical user in this context. To access namespace 1 946, Buildkite 924 may need token 932. Buildkite 924 authenticates to token server 950 to fetch token 932. In some cases, provisioning token 932 to Buildkite 924 may include provisioning token 932 on behalf of Buildkite 924 rather than providing the token directly to Buildkite 924. The choice of provisioning model may depend on the extent to which the arbiter manages credentials (e.g., whether the arbiter acts more like a password manager or like a credentials arbiter that restricts actors from accessing credentials directly).

Buildkite 924 may use token 932 to access resource 3 946 in namespace 1, which enables Buildkite 924 to deploy the container via Kubernetes 936.

This figure illustrates that, in an RBAC ecosystem, actors can be not only users but also other systems, resources, platforms, or programs. As with human users, the binding arbiter may provide JIT authentication to target platforms that the subject authenticates to.

FIG. 10 is a block diagram of a hardware platform 1000. Hardware platform 1000 illustrates selected elements that may be used to realize any of the hardware platforms or compute services or features illustrated herein, including for example hardware platform 501 of FIG. 5. Although a particular configuration is illustrated here, there are many different configurations of hardware platforms, and this example is intended to represent the class of hardware platforms that can provide a computing device. Furthermore, the designation of this example as a "hardware platform" is not intended to require that all examples provide all elements in hardware. Some of the elements disclosed herein may be provided, in various examples, as hardware, software, firmware, microcode, microcode instructions, hardware instructions, hardware or software accelerators, or similar. Hardware platform 1000 may provide a suitable structure for a binding arbiter, controller 104 of FIG. 1, as well as for other computing elements illustrated throughout this specification, including elements external to AV 102. Depending on the example, elements of hardware platform 1000 may be omitted, and other elements may be included.

Hardware platform 1000 is configured to provide a computing device. In various examples, a "computing device" may be or comprise, by way of nonlimiting example, a computer, system on a chip (SoC), workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 1000 is arranged in a point-to-point (PtP) configuration. This PtP configuration is popular for personal computer (PC) and server-type devices, although it is not so limited, and any other bus type may be used. The PtP configuration may be an internal device bus that is separate from CAN bus 170 of FIG. 1, although in some examples they may interconnect with one another.

Hardware platform 1000 is an example of a platform that may be used to implement examples of the teachings of this specification. For example, instructions may be stored in storage 1050. Instructions may also be transmitted to the hardware platform in an ethereal form, such as via a network interface or retrieved from another source via any suitable interconnect. Once received (from any source), the instructions may be loaded into memory 1004 and may be executed by one or more processors 1002 to provide elements, such as an OS 1006, operational agents 1008, or data 1012.

Hardware platform 1000 may include several processors 1002. For simplicity and clarity, only processors PROC0 1002-1 and PROC1 1002-2 are shown. Additional processors (such as 2, 4, 8, 16, 24, 32, 64, or 128 processors) may be provided as necessary while, in other examples, only one processor may be provided. Processors may have any number of cores, such as 1, 2, 4, 8, 16, 24, 32, 64, or 128 cores.

Processors 1002 may be any type of processor and may communicatively couple to chipset 1016 via, for example, PtP interfaces. Chipset 1016 may also exchange data with other elements. In alternative examples, any or all of the PtP links illustrated in FIG. 10 may be implemented as any type of bus or other configuration rather than a PtP link. In various examples, chipset 1016 may reside on the same die or package as a processor 1002 or on one or more different dies or packages. Chipsets may support any suitable number of processors 1002. A chipset 1016 (which may be a chipset, uncore, Northbridge, Southbridge, or other suitable logic and circuitry) may also include one or more controllers to couple other components to one or more central processor units (CPU).

Two memories, 1004-1 and 1004-2, are shown, connected to PROC0 1002-1 and PROC1 1002-2, respectively. As an example, each processor is shown connected to its memory in a direct memory access (DMA) configuration, though other memory architectures are possible, including ones in which memory 1004 communicates with a processor 1002 via a bus. For example, some memories may be connected via a system bus, or in a data center, memory may be accessible in a remote DMA (RDMA) configuration.

Memory 1004 may include any form of volatile or nonvolatile memory, including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 1004 may be used for short, medium, and/or long-term storage. Memory 1004 may store any suitable data or information utilized by platform logic. In some examples, memory 1004 may also comprise storage for instructions that may be executed by the cores of processors 1002 or other processing elements (e.g., logic resident on chipsets 1016) to provide functionality.

In certain examples, memory 1004 may comprise a relatively low-latency volatile main memory while storage 1050 may comprise a relatively higher-latency nonvolatile memory. However, memory 1004 and storage 1050 need not be physically separate devices and, in some examples, may simply represent a logical separation of function (if there is any separation at all). It should also be noted that although DMA is disclosed by way of nonlimiting example, DMA is not the only protocol consistent with this specification and that other memory architectures are available.

Certain computing devices provide memory 1004 and storage 1050, for example, in a single physical memory device, and in other cases, memory 1004 and/or storage 1050 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device, such as a network interface, may provide only the minimum hardware interfaces necessary to perform its logical operation and may rely on a software driver to provide additional necessary logic. Thus, logical blocks disclosed herein are broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Chipset 1016 may be in communication with a bus 1028 via an interface circuit. Bus 1028 may have one or more devices that communicate over it, such as a bus bridge 1032, I/O devices 1035, accelerators 1046, and communication devices 1040, by way of nonlimiting example. In general terms, the elements of hardware platform 1000 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 1040 can broadly include any communication not covered by a network interface and the various I/O devices described herein. This may include, for example, various universal serial bus (USB), FireWire, Lightning, or other serial or parallel devices that provide communications. In a particular example, communication device 1040 may be used to stream and/or receive data within a CAN. For some use cases, data may be streamed using UDP, which is unidirectional and lacks error correction. UDP may be appropriate for cases where latency and overhead are at a higher premium than error correction. If bi-directional and/or error corrected communication are desired, a different protocol, such as TCP, may be preferred.

I/O devices 1035 may be configured to interface with any auxiliary device that connects to hardware platform 1000 but that is not necessarily a part of the core architecture of hardware platform 1000. A peripheral may be operable to provide extended functionality to hardware platform 1000 and may or may not be wholly dependent on hardware platform 1000. Peripherals may include input and output devices, such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

Bus bridge 1032 may be in communication with other devices, such as a keyboard/mouse 1038 (or other input devices such as a touch screen, trackball, etc.), communication devices 1040 (such as modems, network interface devices, peripheral interfaces, peripheral component interconnect (PCI) or peripheral component interconnect express (PCIe), or other types of communication devices that may communicate through a network), and/or accelerators 1046. In alternative examples, any portions of the bus architectures may be implemented with one or more PtP links.

Operating system 1006 may be, for example, Microsoft Windows, Linux, Unix, Mac OS X, iOS, MS-DOS, or an embedded or real-time operating system (including embedded or real-time flavors of the foregoing). For real-time systems, such as an AV, various forms of QNX are popular. In some examples, a hardware platform 1000 may function as a host platform for one or more guest systems that invoke application (e.g., operational agents 1008).

Operational agents 1008 may include one or more computing engines that may include one or more non-transitory computer-readable mediums having stored thereon executable instructions operable to instruct a processor to provide operational functions. At an appropriate time, such as upon booting hardware platform 1000 or upon a command from OS 1006 or a user or security administrator, a processor 1002 may retrieve a copy of the operational agent (or software portions thereof) from storage 1050 and load it into memory 1004. Processor 1002 may iteratively execute the instructions of operational agents 1008 to provide the desired methods or functions.

There are described throughout this specification various engines, modules, agents, servers, or functions. These may include any combination of one or more logic elements of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain examples, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry" to perform a particular function. The terms "circuit" and "circuitry" should be understood to include both the physical circuit and, in the case of a programmable circuit, any instructions or data used to program or configure the circuit.

Where elements of an engine are embodied in software, computer program instructions may be implemented in programming languages, such as an object code, an assembly language, or a high-level language. These may be used with any compatible operating systems or operating environments. Hardware elements may be designed manually or with a hardware description language. The source code may define and use various data structures and communication messages. The source code may be in a computer executable form (e.g., via an interpreter), or the source code may be converted (e.g., via a translator, assembler, or compiler) into a computer executable form or converted to an intermediate form, such as byte code. Where appropriate, any of the foregoing may be used to build or describe appropriate discrete or integrated circuits, whether sequential, combinatorial, state machines, or otherwise.

Communication devices 1040 may communicatively couple hardware platform 1000 to a wired or wireless network or fabric. A "network," as used throughout this specification, may include any communicative platform operable to exchange data or information within or between computing devices, including any of the protocols discussed in connection with FIG. 1 above. A network interface may include one or more physical ports that may couple to a cable (e.g., an Ethernet cable, other cable, or waveguide) or a wireless transceiver.

In some cases, some or all of the components of hardware platform 1000 may be virtualized, in particular the processor(s) and memory. For example, a virtualized environment may run on OS 1006, or OS 1006 may be replaced with a hypervisor or virtual machine manager. In this configuration, a virtual machine running on hardware platform 1000 may virtualize workloads. A virtual machine in this configuration may perform essentially all the functions of a physical hardware platform.

In a general sense, any suitably configured processor can execute any type of instructions associated with the data to achieve the operations illustrated in this specification. Any of the processors or cores disclosed herein may transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 10 may be combined in a SoC architecture or in any other suitable configuration. For example, embodiments disclosed herein can be incorporated into systems, including mobile devices such as smart cellular telephones, tablet computers, personal digital assistants, portable gaming devices, and similar. These mobile devices may be provided with SoC architectures in at least some examples. Such an SoC (and any other hardware platform disclosed herein) may include analog, digital, and/or mixed-signal, radio frequency (RF), or similar processing elements. Other examples may include a multichip module (MCM) with a plurality of chips located within a single electronic package and configured to interact closely with one another through the electronic package. In various other examples, the computing functionalities disclosed herein may be implemented in one or more silicon cores in application-specific integrated circuits (ASICs), FPGAs, and other semiconductor chips.

Selected Examples

There is disclosed, in an example, one or more tangible, non-transitory computer-readable media having stored thereon instructions, the instructions when executed to instruct one or more processors to: receive a platform-independent access binding data structure (a PIAB data structure), the PIAB data structure comprising a platform-independent representation of a subject class, a verb, an object, and a binding comprising a permission for the subject class to perform the verb on the object; convert the PIAB data structure to a first platform-specific binding for a first target platform; and cause the first platform-specific binding to be implemented on the first target platform.

There is further disclosed an example wherein the instructions are further to convert the PIAB data structure to a second platform-specific binding for a second target platform different from the first target platform and cause the second platform-specific binding to be implemented on the second target platform.

There is further disclosed an example wherein the first and second target platforms are members of a heterogeneous platform ecosystem comprising a plurality of platforms with a plurality of incompatible access binding models.

There is further disclosed an example wherein the binding comprises a permission for a subject of the subject class to perform the verb on the object.

There is further disclosed an example wherein the binding restricts a subject of the subject class from performing the verb on the object.

There is further disclosed an example wherein the subject class is a role-based access class.

There is further disclosed an example wherein the subject class is an attribute-based access class.

There is further disclosed an example wherein the subject class is a user group.

There is further disclosed an example wherein the PIAB data structure comprises structured text.

There is further disclosed an example wherein the structured text is one of YAML, JavaScript Object Notation (JSON), or extensible markup language (XML).

There is further disclosed an example wherein the instructions are further to authenticate a subject, and manage a credential for the subject on the first target platform.

There is further disclosed an example wherein the instructions are further to manage credentials for the subject on a plurality of target platforms.

There is further disclosed an example wherein managing credentials comprises selecting a strongest available authentication on the plurality of target platforms.

There is further disclosed an example wherein managing the credential comprises storing the credential in an encrypted memory location.

There is further disclosed an example wherein the instructions are to not expose the credential directly to the subject.

There is further disclosed an example wherein managing the credential comprises providing just-in-time (JIT) authentication to the first target platform while a task pipeline is executed.

There is further disclosed an example of a binding arbiter, comprising: a processor circuit and a memory; and instructions encoded within the memory to instruct the processor circuit to: receive a bindings data structure, wherein the bindings data structure is platform-agnostic and comprises a specification of a role, an object, a verb for the role to perform on the object, and a permission binding to allow or deny the role to perform the verb on the object; and translate the bindings data structure into a set of directives to implement first corresponding permissions on a first target platform.

There is further disclosed an example wherein the instructions are further to translate the bindings data structure into a set of directives to implement corresponding permissions on a second target platform.

There is further disclosed an example wherein the first and second target platforms are members of a heterogeneous platform ecosystem comprising a plurality of platforms with a plurality of incompatible access binding models.

There is further disclosed an example wherein the bindings data structure comprises structured text.

There is further disclosed an example wherein the structured text is one of YAML, JavaScript Object Notation (JSON), or extensible markup language (XML).

There is further disclosed an example wherein the instructions are further to authenticate a subject, and manage a credential for the subject on the first target platform.

There is further disclosed an example wherein the instructions are further to manage credentials for the subject on a plurality of target platforms.

There is further disclosed an example wherein managing credentials comprises selecting a strongest available authentication method on the plurality of target platforms.

There is further disclosed an example wherein managing the credential comprises storing the credential in an encrypted memory location.

There is further disclosed an example wherein the instructions are to not expose the credential directly to the subject.

There is further disclosed an example wherein managing the credential comprises providing just-in-time (JIT) authentication to the first target platform while a task pipeline is executed.

There is further disclosed an example of a computer-implemented method, comprising: translating platform-independent role-based access controls (a PI-RBAC) from a platform-independent structured data format into platform-specific access permissions; and implementing the platform-specific access permissions on an ecosystem comprising a plurality of heterogeneous platforms with respective platform-specific permission models, wherein the respective platform-specific permission models are compatible with the PI-RBAC, and wherein at least some of the respective platform-specific permission models are incompatible with one another.

There is further disclosed an example wherein the PI-RBAC comprise permissions for subjects to perform verbs on objects.

There is further disclosed an example wherein the PI-RBAC comprise restrictions on subjects from performing verbs on objects.

There is further disclosed an example wherein the PI-RBAC comprise structured text.

There is further disclosed an example wherein the structured text is one of YAML, JavaScript Object Notation (JSON), or extensible markup language (XML).

There is further disclosed an example further comprising authenticating a subject and managing credentials for the subject on the heterogeneous platforms.

There is further disclosed an example wherein managing credentials comprises selecting a strongest available authentication on the plurality of heterogeneous platforms.

There is further disclosed an example wherein managing credentials comprises storing the credential in an encrypted memory location.

There is further disclosed an example further comprising restricting the subject from directly accessing the credentials.

There is further disclosed an example wherein managing credentials comprises providing just-in-time (JIT) authentication to one or more of the heterogeneous platforms while a task pipeline is executed.

There is further disclosed an example of an apparatus comprising means for performing the method.

There is further disclosed an example wherein the means for performing the method comprise a processor and a memory.

There is further disclosed an example wherein the memory comprises machine-readable instructions that, when executed, cause the apparatus to perform the method.

There is further disclosed an example wherein the apparatus is a computing system.

There is further disclosed an example of at least one computer-readable medium comprising instructions that, when executed, implement a method or realize an apparatus.

Variations and Implementations

As may be appreciated by one skilled in the art, aspects of the present disclosure, described herein, may be embodied in various manners (e.g., as a method, a system, a computer program product, or a computer-readable storage medium). Accordingly, aspects of the present disclosure may take the form of an entirely hardware example, an entirely software example (including firmware, resident software, microcode, etc.), or an example combining software and hardware aspects that may generally be referred to herein as a "circuit," "module," or "system." In at least some cases, a "circuit" may include both the physical hardware of the circuit, plus any hardware or firmware that programs or configures the circuit. For example, a network circuit may include the physical network interface circuitry, as well as the logic (software and firmware) that provides the functions of a network stack.

Functions described in this disclosure may be implemented as an algorithm executed by one or more hardware processing units, e.g. one or more microprocessors, of one or more computers. In various examples, different steps and portions of the steps of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various examples, such a computer program, may, for example, be downloaded (updated) to the existing devices and systems (e.g. to the existing perception system devices and/or their controllers, etc.) or be stored upon manufacturing of these devices and systems.

The foregoing detailed description presents various descriptions of specific certain examples. However, the innovations described herein can be embodied in a multitude of different ways, for example, as defined and covered by the claims and/or select examples. In the following description, reference is made to the drawings where like reference numerals can indicate identical or functionally similar elements. Elements illustrated in the drawings are not necessarily drawn to scale. Moreover, certain examples can include more elements than illustrated in a drawing and/or a subset of the elements illustrated in a drawing. Further, some examples can incorporate any suitable combination of features from two or more drawings.

The preceding disclosure describes various illustrative examples for implementing the features and functionality of the present disclosure. While components, arrangements, and/or features are described below in connection with various example embodiments, these are merely examples used to simplify the present disclosure and are not intended to be limiting.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "top," "bottom," or other similar terms to describe a spatial relationship between various components, or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure may be apparent from the description and the claims. Note that all optional features of the apparatus described above may also be implemented with respect to the method or process described herein, and specifics in the examples may be used anywhere in one or more examples.

The "means for" in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that, when executed, cause the system to perform any of the activities discussed above.

As described herein, one aspect of the present technology is the gathering and use of data available from various sources to improve quality and experience. The present disclosure contemplates that, in some instances, this gathered data may include personal information. The present disclosure contemplates that the entities involved with such personal information respect and value privacy policies and practices.

What is claimed is:

1. One or more non-transitory computer-readable media having stored thereon instructions, the instructions when executed to instruct one or more processors to:
   receive, at a binding arbiter, a platform-independent access binding (PIAB) data structure, the PIAB data structure comprising a first permission for a subject class to perform a first verb on a first object on a first target platform, and a second permission for the subject class to perform a second verb on a second object on a second target platform;
   map, by the binding arbiter, the first verb to a first platform action permission specific to the first target platform;

map, by the binding arbiter, the second verb to a second platform action permission specific to the second target platform;

receive, from a user at the binding arbiter, a request to execute a first task of a software build pipeline on the first target platform and to execute a second task of the software build pipeline on the second target platform, the first task comprising setting up a container by downloading an operating system image and a development environment image, the second task comprising deploying a microservice on the container by pulling and compiling source files;

authenticate, by the binding arbiter, the user;

determine, by the binding arbiter, that the user is associated with the subject class;

authenticate, by the binding arbiter, with the first target platform to obtain the first platform action permission;

authenticate, by the binding arbiter, with the second target platform to obtain the second platform action permission;

execute, by the user, the first task and the second task of the pipeline on the first target platform and the second target platform respectively;

after the first task is executed on the first target platform, revoke, by the binding arbiter, authentication with the first target platform; and after the second task is executed on the second target platform, revoke, by the binding arbiter, authentication with the second target platform.

2. The one or more non-transitory computer-readable media of claim 1, wherein the first target platform comprises one or more of: Docker Hub and Artifactory.

3. The one or more non-transitory computer-readable media of claim 1, wherein the first and second target platforms are members of a heterogeneous platform ecosystem comprising a plurality of platforms with a plurality of incompatible access binding models.

4. The one or more non-transitory computer-readable media of claim 1, wherein the second target platform comprises GitHub.

5. The one or more non-transitory computer-readable media of claim 1, wherein the user comprises a software build system.

6. The one or more non-transitory computer-readable media of claim 1, wherein the subject class is a role-based access class or an attribute-based access class.

7. The one or more non-transitory computer-readable media of claim 1, wherein the PIAB data structure comprises structured text.

8. The one or more non-transitory computer-readable media of claim 7, wherein the structured text is one of YAML, JavaScript Object Notation (JSON), or extensible markup language (XML).

9. The one or more non-transitory computer-readable media of claim 1, wherein the subject class comprises a container build role.

10. The one or more non-transitory computer-readable media of claim 1, wherein the subject class comprises a deployer role, the user comprises a software build system, and authenticating with the first target platform comprises obtaining, by the binding arbiter, a token to access the first target platform on behalf of the software build system.

11. The one or more non-transitory computer-readable media of claim 1, wherein the subject class comprises a deployer role, the user comprises a software build system, and authenticating with the second target platform comprises obtaining, by the binding arbiter, a token to access the second target platform on behalf of the software build system.

12. The one or more non-transitory computer-readable media of claim 1, wherein the instructions are further to manage credentials by the binding arbiter for the user by storing the credential in an encrypted memory location of the binding arbiter.

13. A binding arbiter, comprising:
a processor circuit and a memory; and
instructions encoded within the memory to instruct the processor circuit to:
receive a platform-independent access binding (PIAB) data structure, the PIAB data structure comprising a first permission for a subject class to perform a first verb on a first object on a first target platform, and a second permission for the subject class to perform a second verb on a second object on a second target platform;
receive, from a user a request to execute a first task of a software build pipeline on the first target platform and to execute a second task of the software build pipeline on the second target platform, the first task comprising setting up a container by downloading an operating system image and a development environment image, the second task comprising deploying a microservice on the container by pulling and compiling source files;
authenticate the user;
determine that the user is associated with the subject class;
authenticate with the first target platform to obtain the first permission;
authenticate with the second target platform to obtain the second permission;
after the first task is executed on the first target platform, revoke authentication with the first target platform; and
after the second task is executed on the second target platform, revoke authentication with the second target platform.

14. The binding arbiter of claim 13, wherein the instructions are further to:
map, the first verb to a first platform action permission specific to the first target platform; and
map, the second verb to a second platform action permission specific to the second target platform.

15. The binding arbiter of claim 13, wherein the first and second target platforms are members of a heterogeneous platform ecosystem comprising a plurality of platforms with a plurality of incompatible access binding models.

16. The binding arbiter of claim 13, wherein the PIAB data structure comprises YAML, JavaScript Object Notation (JSON), or extensible markup language (XML) structured text.

17. The binding arbiter of claim 13, wherein the subject class comprises a deployer role, the user comprises a software build system, authenticating with the first target platform comprises obtaining a first token to access the first target platform on behalf of the software build system, and authenticating with the second target platform comprises obtaining a second token to access the second target platform on behalf of the software build system.

18. A computer-implemented method being performed by a binding arbiter, comprising
receiving a platform-independent access binding (PIAB) data structure, the PIAB data structure comprising a first permission for a subject class to perform a first verb on a first object on a first target platform, and a second permission for the subject class to perform a second verb on a second object on a second target platform;

receiving, from a user, a request to execute a first task of a software build pipeline on the first target platform and to execute a second task of the software build pipeline on the second target platform, the first task comprising setting up a container by downloading an operating system image and a development environment image, the second task comprising deploying a microservice on the container by pulling and compiling source files;

authenticating the user;

determining that the user is associated with the subject class;

transmitting a first directive to the first target platform to cause the first target platform to implement the first permission;

obtaining a first token on behalf of the user to access the first target platform;

transmitting a second directive to the second target platform to cause the second target platform to implement the second permission;

obtaining a second token on behalf of the user to access the second target platform;

after the first task is executed on the first target platform using the first token, revoking the first token; and after the second task is executed on the second target platform using the second token, revoking the second token.

19. The computer-implemented method of claim 18, further comprising storing the first token and the second token in an encrypted memory location of the binding arbiter.

20. The computer-implemented method of claim 18, wherein:

the subject class comprises a deployer role; and the user comprises a software build system.

\* \* \* \* \*